United States Patent
Hodroj

(10) Patent No.: US 9,998,285 B2
(45) Date of Patent: Jun. 12, 2018

(54) SECURITY HARDENING FOR A WI-FI ROUTER

(71) Applicant: T-Mobile, USA, Inc., Bellevue, WA (US)

(72) Inventor: Samir Hodroj, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 27 days.

(21) Appl. No.: 14/979,336

(22) Filed: Dec. 22, 2015

(65) Prior Publication Data

US 2017/0180135 A1   Jun. 22, 2017

(51) Int. Cl.
| | |
|---|---|
| *G06F 21/57* | (2013.01) |
| *H04L 9/32* | (2006.01) |
| *H04W 84/12* | (2009.01) |
| *G06F 9/445* | (2018.01) |
| *H04W 12/10* | (2009.01) |
| *H04L 9/08* | (2006.01) |
| *H04W 12/12* | (2009.01) |

(52) U.S. Cl.
CPC .......... *H04L 9/3247* (2013.01); *G06F 8/665* (2013.01); *G06F 21/572* (2013.01); *H04L 9/0825* (2013.01); *H04L 9/3263* (2013.01); *H04W 12/10* (2013.01); *H04W 12/12* (2013.01); *H04W 84/12* (2013.01)

(58) Field of Classification Search
CPC ..... H04L 9/3247; H04L 9/3263; H04L 63/12; H04L 63/123; G06F 21/572; G06F 8/665; H04W 12/10
See application file for complete search history.

(56) References Cited

U.S. PATENT DOCUMENTS

| | | | | |
|---|---|---|---|---|
| 5,786,773 | A * | 7/1998 | Murphy | G01S 19/07 340/947 |
| 6,546,492 | B1 * | 4/2003 | Walker | G06F 8/65 726/3 |
| 7,957,394 | B1 | 6/2011 | Cohen et al. | |
| 8,018,850 | B2 | 9/2011 | Beek et al. | |
| 8,184,550 | B2 | 5/2012 | Beck et al. | |
| 2003/0072304 | A1 | 4/2003 | Gummalla et al. | |
| 2005/0021968 | A1 * | 1/2005 | Zimmer | G06F 21/572 713/176 |
| 2005/0174935 | A1 | 8/2005 | Segel | |
| 2006/0005046 | A1 * | 1/2006 | Hars | G06F 21/572 713/191 |
| 2006/0143600 | A1 * | 6/2006 | Cottrell | G06F 21/572 717/168 |

(Continued)

OTHER PUBLICATIONS

Abrahamsson, Security Enhanced Firmware Update Procedures in Embedded Systems, 2008.*

(Continued)

*Primary Examiner* — Minh Dinh
(74) *Attorney, Agent, or Firm* — Han Santos, PLLC

(57) ABSTRACT

A method and system of securing the firmware of a router. Upon determining that a received digital message does not have integrity or the digital signature of the received digital message is not correct, the digital message is ignored or discarded. Otherwise the digital message is decrypted and a new firmware extracted therefrom. The existing firmware is then flashed with the new extracted firmware.

20 Claims, 5 Drawing Sheets

(56) References Cited

U.S. PATENT DOCUMENTS

2009/0228697 A1* 9/2009 Kurashige ............... G06F 8/65
713/100

OTHER PUBLICATIONS

Jones, Exploiting Embedded Devices, SANS Institute, 2012.*
Ramsdell, Request for Comments 2633—S/MIME Version 3 Message Specification, 1999.*
Shade, Implementing Secure Remote Firmware Updates, 2011.*
Non-Final Office Action for U.S. Appl. No. 14/979,363, dated Oct. 6, 2017, 17 pages.
Final Office Action for U.S. Appl. No. 14/872,029, dated Oct. 19, 2017, 23 pages.
Non-Final Office Action for U.S. Appl. No. 14/872,029, dated Apr. 7, 2017, 13 pages.

* cited by examiner

SECURITY HARDENING FOR A WI-FI ROUTER

BACKGROUND

In recent years, the use of routers has become increasingly popular. A router is a networking device that forwards data packets from one computer network to another through the networks that comprise the internetwork, until the data packets reach their destination. Routers are found in homes and offices and are typically used to pass data, such as email, internet message (IM), multimedia, and web pages, between a computer and the Internet. At home, a router may be in the form of a cable or digital subscriber line (DSL) router that connects to the Internet through an internet service provider (ISP). More advanced routers, such as enterprise routers, connect large business or ISP networks to core routers that forward data at advanced speeds.

A router may have an operating system and/or system boot code, sometimes collectively referred to herein as firmware, for supporting one or more networking communications protocol standards. Each network interface uses this specialized computer software to enable data packets to be forwarded from one protocol transmission system to another. However, there are generally not enough security measures to prevent the reading and/or alteration of the firmware of a router. Indeed, router firmware typically can be easily replaced with third-party custom router firmware. Router manufacturers may even provide one or more ways to "flash" new firmware, which is typically used to upgrade the router's firmware to a new version from the manufacturer.

However, many users do not flash their router firmware with a file provided by a manufacturer; rather, they may flash the firmware with a file provided by a third-party that may have a customized operating system, potentially rendering the router more vulnerable to hacking attacks, unauthorized modification, repurposing, or accidental hard/soft bricking (i.e., the corruption of the firmware rendering the router inoperable).

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Overview

Figure 1:
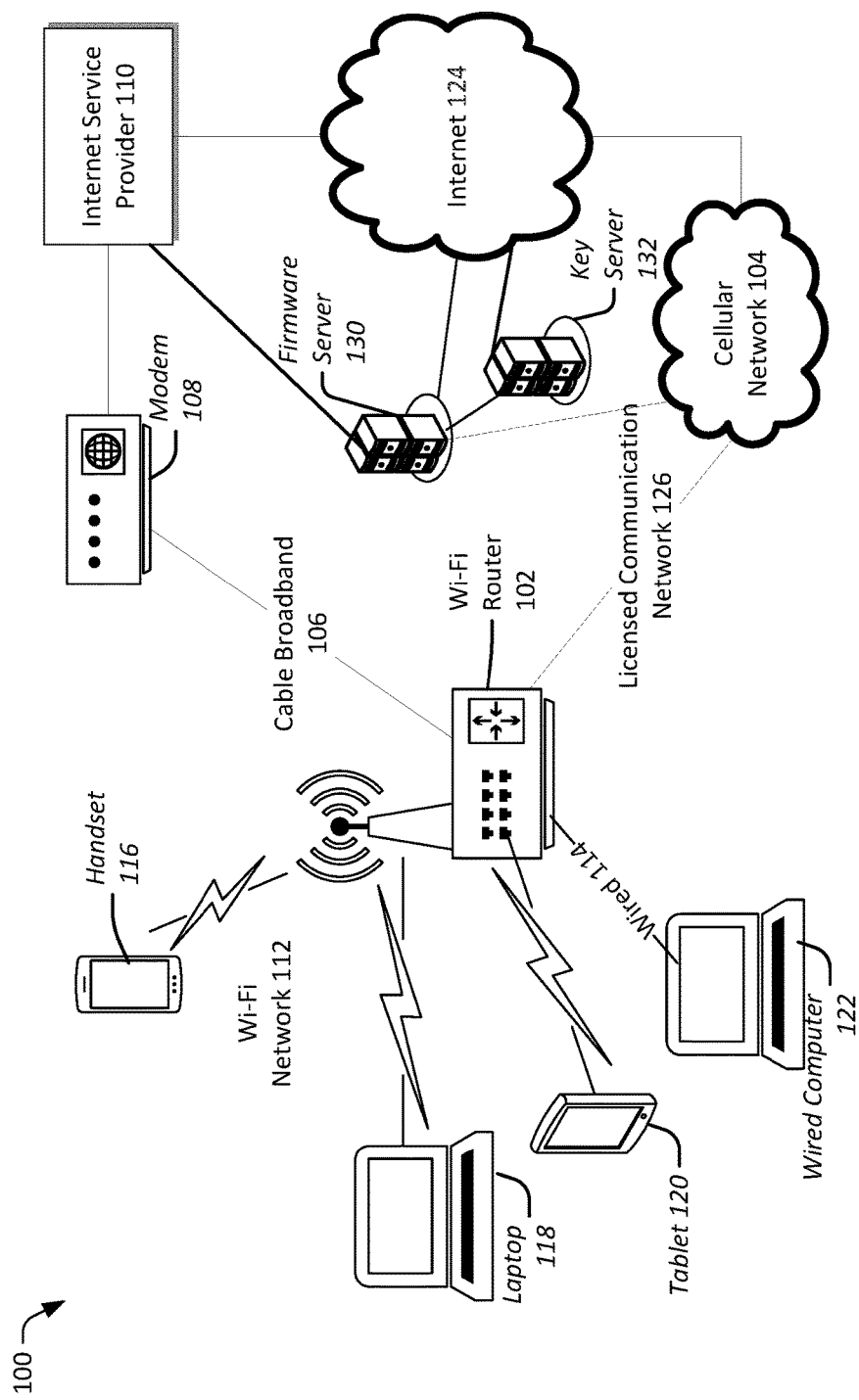
FIG. 1 illustrates an example architecture for implementing security hardening for a Wi-Fi router.

This disclosure is generally related to router security techniques, and more particularly to the prevention of unauthorized reading and flashing of the operating system of a router.

The firmware of a router is typically unencrypted. Put differently, the firmware of a router can be easily read by a user via a computing device, such as a personal computer (PC), and then altered or overwritten, sometimes referred to herein as flashing the router.

Most routers utilize an operating system. One example operating system is Linux or one of its variants. Another example is to use an embedded operating system such as Windows Embedded™. There typically are a set of hardware interfaces and a web server running on top of an operating system kernel, with the routing, filtering and Wi-Fi management running as separate processes. Routers usually provide a back-door upgrade/debug mode, which gives a user access to the file system (including the firmware of the router). To that end, a shell, such as Telnet or Secure Shell (SSH) may be used to interface with the router.

Telnet is an application layer protocol that is used on the internet or local area networks to provide a bidirectional interactive text-oriented communication using a virtual terminal connection, such as a personal computer or handheld device. However, because of security concerns when using Telnet over an open network (e.g., the Internet), its popularity has steadily decreased in favor of secure shell (SSH), which incorporates more comprehensive authentication, authorization and encryption. SSH is an encrypted network protocol that allows remote login and other network services to operate securely over an unsecured network. Although substantially more secure than Telnet, SSH can sometimes be decrypted, allowing malicious users to read the content of SSH sessions, ultimately allowing access to the router firmware.

The techniques discussed herein provide additional layers of security to routers to prevent unauthorized access to the file firmware of a router, thereby preventing unauthorized modification, repurposing, or accidental hard/soft bricking of the router.

In one aspect, there is a provisioning stage, where a server creates a firmware that prevents unauthorized access to the firmware after it is loaded onto the router. During this stage, the server creates a provisioning digital message that includes the encrypted firmware and a digital certificate. In various embodiments, the decryption key may be provided before, after, or together with the provisioning digital message. Upon receiving the digital message, the router decrypts the digital message, extracts the firmware therefrom, and installs it in a memory of the router. Advantageously, the firmware stored in the router prevents unauthorized access.

In one aspect, there is a maintenance stage, where the router prevents unauthorized access to the existing stored firmware. If an inquiry is received by the router for access to the stored firmware or alteration thereof, a determination is made by the router as to whether (i) the inquiry (in the form of a received digital message) has integrity and (ii) the digital signature of the digital message is correct. Upon the router determining that (i) the digital message does not have integrity, or (ii) the digital signature of the digital message is not correct, the digital message is ignored or discarded, thereby preventing unauthorized access. However, if the digital message does have integrity and the digital signature of the digital message is correct, it is indicative that the digital message is from an authorized source. Consequently, the digital message is decrypted, the firmware extracted therefrom, and the existing firmware is flashed with the new firmware.

The techniques described herein may be implemented in a number of ways. Example implementations are provided below with reference to the following figures.

Example System Architecture

FIG. 1 illustrates an example architecture for implementing security hardening for a Wi-Fi router. System 100 includes a Wi-Fi router 102 that is in communication with various user equipment (UE) in the form of a handset 116, laptop 118, tablet 120, wired laptop 122, and other (not shown) user UE, such as set top boxes, gaming consoles, wireless printers, and other UE that typically communicate with a Wi-Fi router. The connection between a UE and the Wi-Fi router 102 may be wireless (e.g., 112) or wired 114 (e.g., via Ethernet cable).

Accordingly, various UE may interact with the Wi-Fi router 102 to exchange data with other UE that are serviced by the Wi-Fi router 102 and/or to communicate with the internet 124. To that end, the Wi-Fi router 102 may be connected via cable broadband 106 to a cable modem 108. The cable modem 108 is connected to an Internet Service Provider (ISP) 110 that is connected to the internet 124.

In one embodiment, the Wi-Fi router 102 may be connected via LTE broadband 126 to a radio access network (RAN) 104.

In one embodiment, system 100 includes a firmware server 130 that may be used to provision the Wi-Fi router 102 with firmware and later to provide firmware updates. Updates may include bug fixes (patches), additional features, and upgraded protocol support as those protocols evolve. Typically, firmware for a router includes Telnet and/or SSH capability, which may expose the Wi-Fi router 102 to various vulnerabilities, as discussed above. In contrast, the firmware provided by the server 130 is configured to prevent unauthorized access to the firmware of the Wi-Fi router 102. For example, telnet or SSH capability is removed from the firmware prior to provisioning the Wi-Fi router 102. Further, any firmware update provided by the firmware server 130 is configured to prevent unauthorized access (e.g., has the Telnet and/or SSH capability removed from the firmware update).

Accordingly, the firmware server 130, which may be a cloud server, is configured to provide a compiled firmware to the Wi-Fi router 102 that is not vulnerable to third party access. That is because backdoor ways of accessing the file system of the Wi-Fi router 102 are removed, thereby protecting the firmware, including the operating system, from being read, altered, removed, and/or replaced by an unauthorized user via their UE (e.g., using either a wired or wireless connection to the Wi-Fi router 102) or from a remote computing device over the cable broadband 106 (or the cellular network 104 via the licensed communication network 126).

In one embodiment, the firmware server 130 encrypts the firmware before it is sent to the Wi-Fi router 102. As used herein, encryption refers to encoding the information of the firmware in such a way that only authorized parties can read it. Encryption does not in itself prevent interception; rather, the encryption denies the content of the firmware of the Wi-Fi router 102 to the interceptor (i.e., unauthorized user). For example, since the telnet and SSH capabilities of the Wi-Fi router 102 have been removed, a nefarious (e.g., unauthorized) user may try to access the firmware server 130 to obtain the firmware therefrom. The nefarious user would then be able to make desired changes and attempt to flash the Wi-Fi router 102 with the unauthorized altered operating system. However, since the firmware of the digital message is encrypted, the nefarious user is prevented from making modifications, because the nefarious user lacks the decryption key.

In one embodiment, system 100 includes a key server 132 that is configured to provide keys to one or more firmware servers, such as server 130. In one embodiment, key server 132 is part of firmware server 130. In order for the firmware server 130 to know how to encrypt, the firmware server 130 may check a database storing the unique identity of a router. To that end, the router 102 may be registered with a cellular 104 or ISP 110 provider. Accordingly, the router 102 may have a registered unique identification (ID) and/or phone number. The firmware server 130 can therefore know what key to use to encrypt a message.

Accordingly, an encryption algorithm may be used that generates a cipher text that can be read upon decryption. An authorized recipient (i.e., Wi-Fi router 102) can decrypt the message with the key provided by the originator (e.g., the firmware server 130) to the recipient (i.e., the Wi-Fi router 102), but not unauthorized interceptors.

For example, symmetric key encryption may be used, where the encryption and decryption keys are the same. Thus, the original service provider, represented by the firmware server 130, may provide the firmware of the Wi-Fi router 102 in an encrypted format. The firmware server 130 also provides the router with a decryption key. In one embodiment, asymmetric key encryption may be used. The key provided during provisioning may be the key to access the key server 132 to obtain a decryption key.

In one embodiment, a digital signature is provided and encryption is applied to the cipher text when it is created (e.g., by the firmware server 130) to avoid tampering. As used herein, a digital signature is a mathematical scheme for demonstrating the authenticity of a digital message including the firmware. A valid digital signature can later indicate to the Wi-Fi router 102 that the digital message was created by an authorized sender, such as the firmware server 130, and that the digital message was not altered in transit, thereby assuring the integrity of any digital message received by the Wi-Fi router 102.

This decryption key, which is received during a provisioning stage, is later used by the Wi-Fi router 102 for future updates from the firmware server. In one embodiment, the decryption key is tracked by the key server 132. The new authorized updates can flash the firmware (including the operating system) with an update, when appropriate. Thus, during an initial provisioning, the Wi-Fi router 102 may receive a digital message from the firmware server 130, the message comprising a digital certificate, an encryption key, and the firmware. In various embodiments, the firmware may later be updated by an authorized firmware distributor, such as the firmware server 130, at predetermined intervals (e.g., every two days) or as appropriate (e.g., when a new firmware release becomes available). The firmware update may be provided (e.g., pushed) by the firmware server 130 and or requested (e.g., pulled) by the Wi-Fi router 102.

The firmware server 130 may communicate to the Wi-Fi router 102 via the ISP 110. In one embodiment, the firmware server 130 communicates with the Wi-Fi router 102 via the cellular network 104.

Example Router Components

Figure 2:
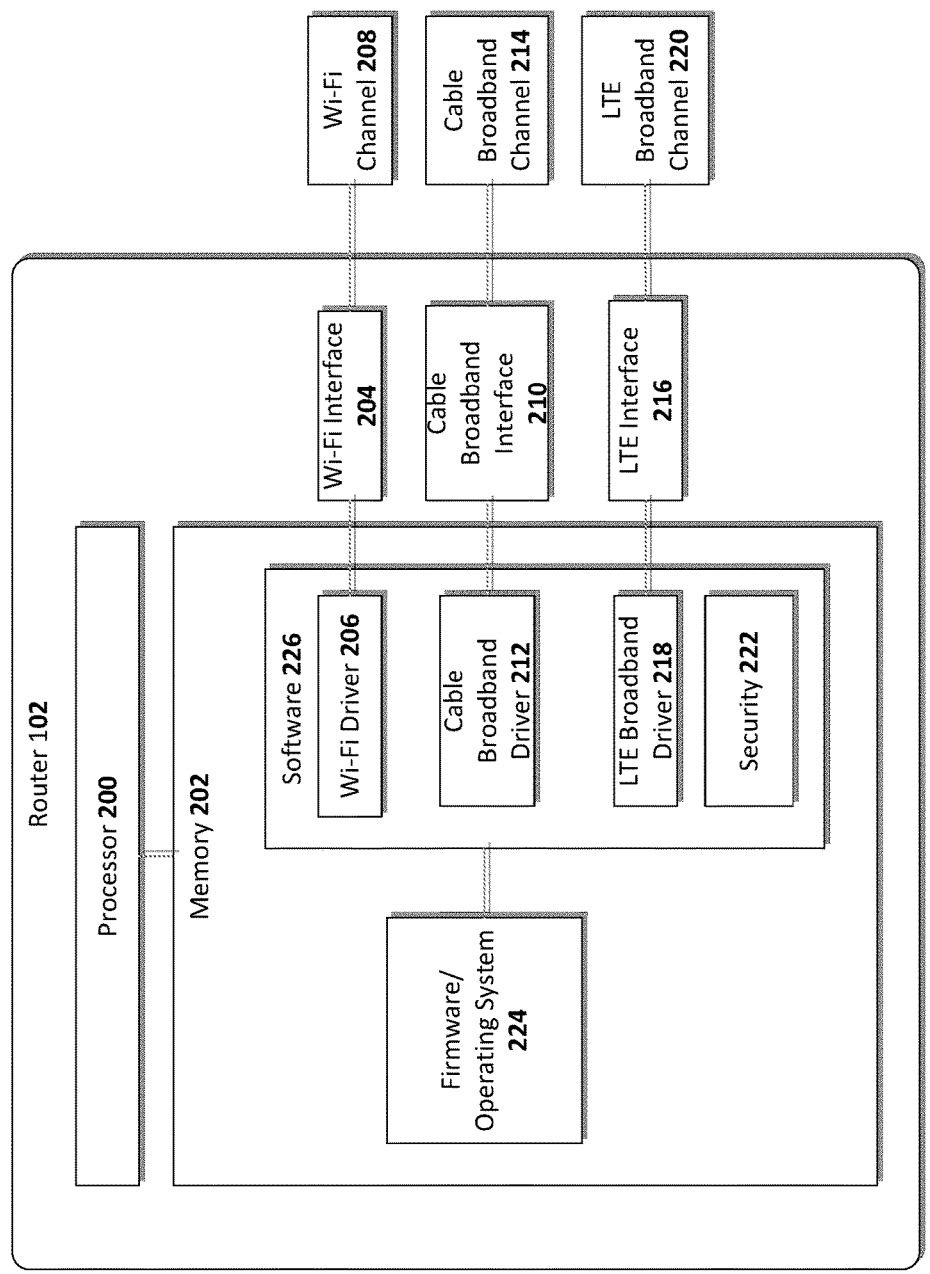
FIG. 2 is a block diagram showing various hardware, software, and communications components of a router, consistent with an exemplary embodiment.

FIG. 2 is a block diagram showing various hardware, software, and communications components of an illustrative router 102. A router 102 may include, inter alia, a processor 200 and a memory 202. Memory 202 of the router 102 may be any computer-readable media that may store several software components 226, including firmware/operating system 224. In general, a software component is a set of computer executable instructions stored together as a discrete whole. Examples of software components 226 include binary executables such as static libraries, dynamically linked libraries, and executable programs. Other examples of software components 226 include interpreted executables that are executed on a run time such as servlets, applets, p-Code binaries, and Java binaries. Software components 226 may run in kernel mode and/or user mode.

Software components 226 may include a Wi-Fi driver 206 and a cable broadband driver 212. In one embodiment, the software components 226 include a long term evolution (LTE) broadband driver 218 in addition to (or instead of) the cable broadband driver 212.

In one embodiment, the software components 226 include a security application 222 that is configured to perform security functions for the Wi-Fi router 102. For example, upon the Wi-Fi router 102 receiving a digital message from a UE or a remote server, the security application 222 may determine the integrity of the received digital message. To that end, a determination is made whether the digital message is in the format of a firmware update. For example, typical updates in firmware may be in the format of an .img, .iso, or .chk extension or variant thereof (e.g., zipped version thereof). Files that have an .img extension are disk image files that store information otherwise available on the memory (e.g., disk) the image was created from (e.g., the firmware server 130). Similarly an ISO image is an image file of an optical disk. If the received digital message is not related to a firmware update, the request is ignored and/or discarded by the security application 222.

In one embodiment, the security application 222 is configured to verify the digital signature of the received digital message. To that end, the security application 222 compares the digital signature of the digital message received with a previously stored digital signature.

Alternatively or in addition, the security functions of (i) determining the integrity of the received digital message, and/or (ii) verifying the digital signature of the received digital message are performed by a remote authentication server (not shown).

In various embodiments, the security application 222 may be preprogrammed in the memory 202 by the manufacturer of the Wi-Fi router 102 or provided by a remote server, such as the firmware server 130, during provisioning of the Wi-Fi router 102. For example, during an initial provisioning, the firmware server 130, may provide a digital message to the Wi-Fi router 102 that includes the firmware code, the encryption key and a digital certificate. In addition, the digital message may include the security application 222, such that it can be used for subsequent updates of the firmware and to prevent unauthorized access to the firmware. Alternatively, (i.e., instead of sending the security application 222 in the digital message during the initial provisioning) the application 222 may be sent separately by the firmware server 130, either before the initial provisioning digital message or thereafter.

In one embodiment, the Wi-Fi router 102 does not include the security application 222 as part of its software 226. Instead, the security features discussed in connection with the security application 222 are performed by the firmware 224 itself, which is stored in the memory 202 of the Wi-Fi router 102. The Firmware 224 refers to a small piece of code that resides in (e.g., non-volatile portion) of the memory 202. In one embodiment, the firmware 224 is responsible for loading (e.g., including digital signature verification) and managing (e.g., flashing OS for updates/recovery) the operating system that is installed on the Wi-Fi router 102. It is the responsibility of the operating system to carry out the actual task provided by the firmware. An operating system is code running on the Wi-Fi router 102 that provides services for applications to access the capabilities of the Wi-Fi router 102. For example, it may provide time-slicing of the processor, a file system to access, input and output, and the like. For simplicity, the firmware and operating system are collectively referred to herein as firmware.

In the example of FIG. 2, the Wi-Fi router 102 includes a Wi-Fi interface 204 that is communicatively coupled to a Wi-Fi driver 206 resident in the memory 202. The Wi-Fi interface 204 provides access to one or more networks, such as Wi-Fi Channel 208, such that authorized UE may wirelessly communicate with the Wi-Fi router 102.

The Wi-Fi router 102 may include a cable broadband interface 210 that is communicatively coupled to the cable broadband driver 212 in the memory 202. The cable broadband interface 210 may connect via a cable to the cable modem 108, which may provide a cable broadband channel 214 via an ISP 110. Accordingly, any Telnet or SSH capability is removed from the firmware. Put differently, any backdoor ways of accessing the firmware of the Wi-Fi router 102 are removed from the firmware by the firmware server 130.

Example Call Flow Processes

Figure 3A:
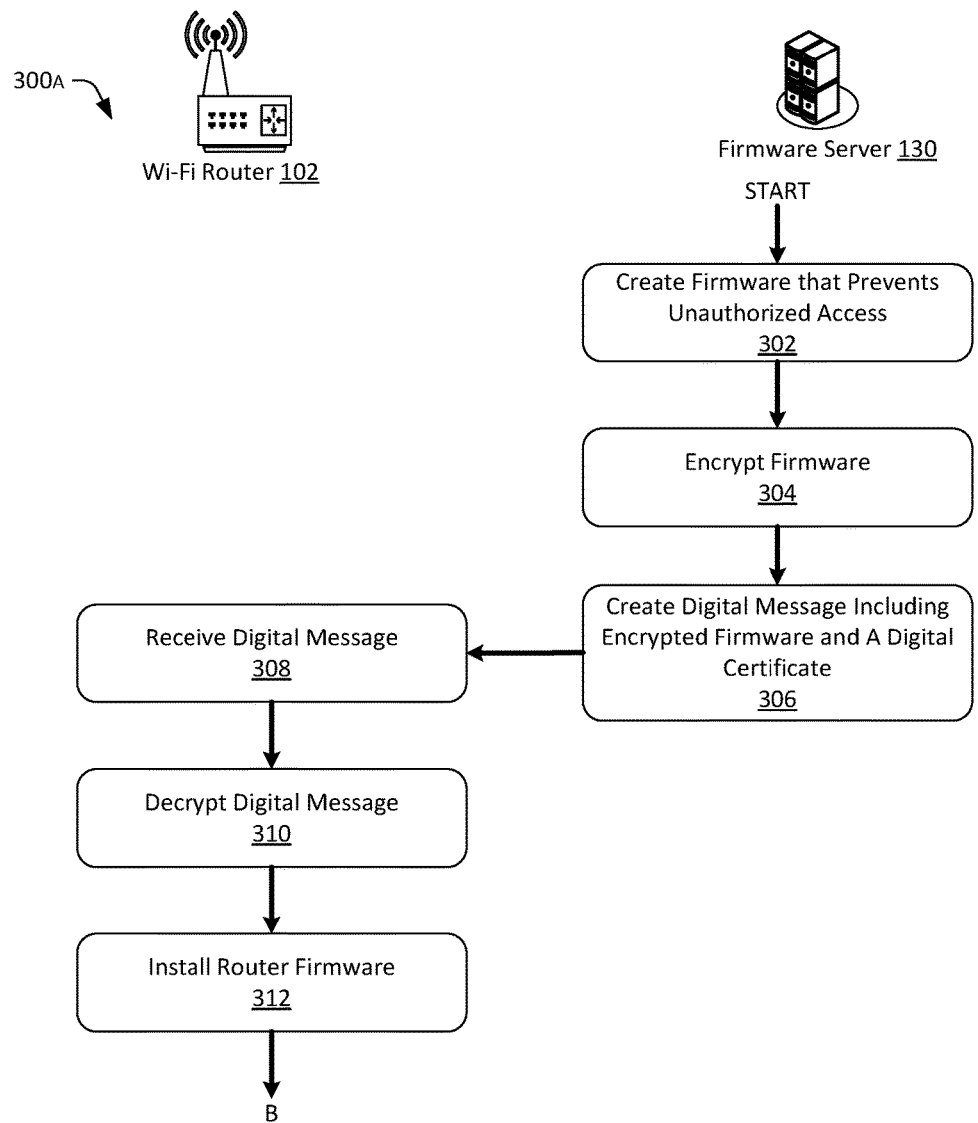
FIG. 3A illustrates a high level example call flow for a provisioning stage of the router of FIG. 2.
Figure 3B:
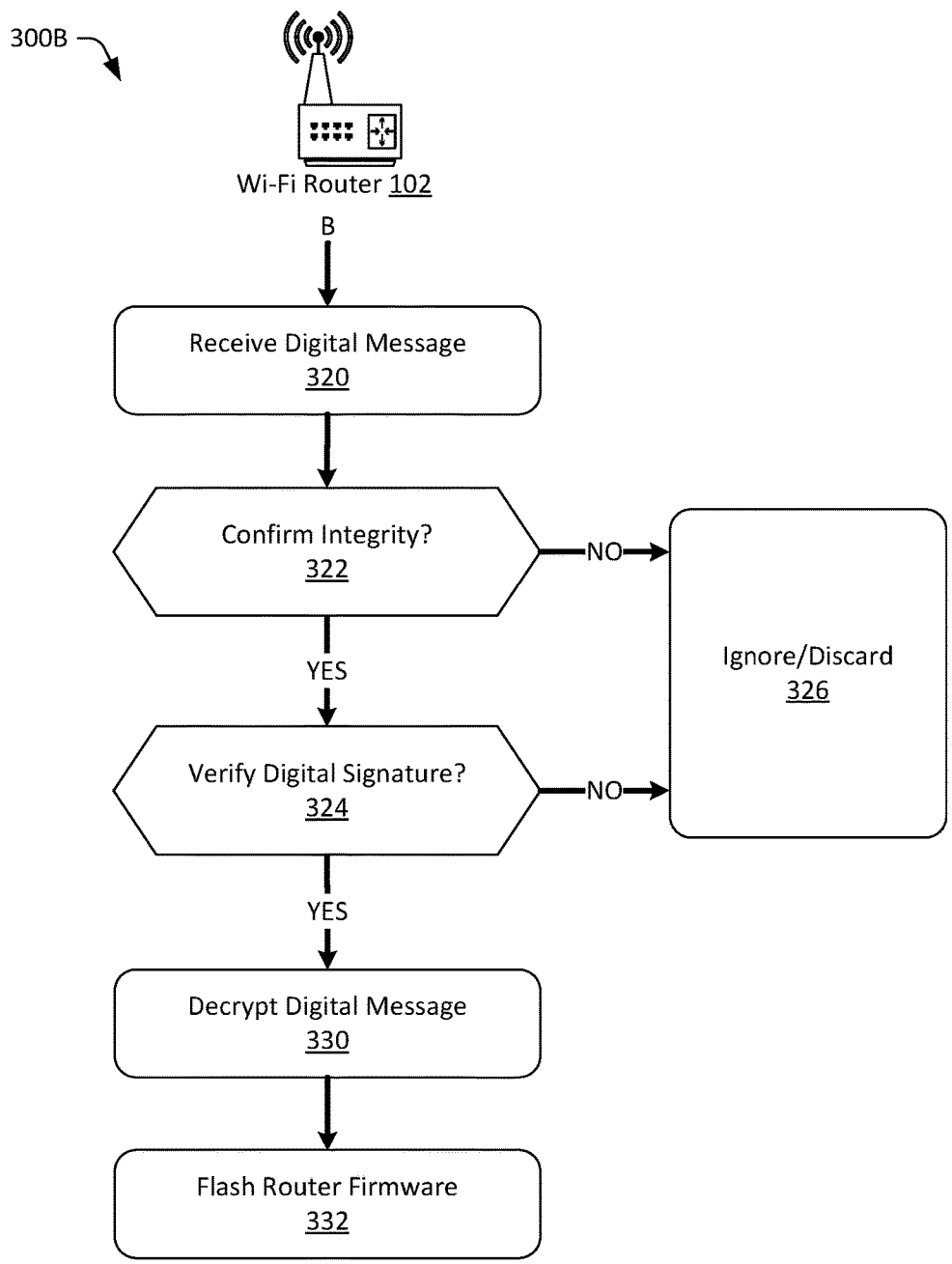
FIG. 3B illustrates a high level example call flow for a firmware maintenance stage of the router of FIG. 2.

With the foregoing overview of the security hardening system 100 and the various components of an example router 102, it may be helpful now to consider a high-level discussion of example call flow processes. To that end, FIGS. 3A and 3B illustrate high level example call flow processes for security hardening a Wi-Fi router, such as router 102. In particular, FIG. 3A illustrates a high level example call flow for a provisioning stage and FIG. 3B illustrates a high level example call flow for a firmware maintenance stage that may occur after the provisioning stage. The call flow processes 300A and 300B are illustrated as a collection of blocks in logical flows, which each represents a sequence of operations that can be implemented in hardware, software, or a combination thereof.

In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the processes 300A and 300B are described with reference to system 100 of FIG. 1 and the Wi-Fi router 102 of FIG. 2.

The initial provisioning process starts with block 302, where the firmware server 130 creates a firmware that prevents unauthorized access thereof. The firmware server 130 has the identity of the user who owns the Wi-Fi router 102 to be updated. The user is associated with a router ID in a user database (e.g., the home location register (HLR) or the home subscribe server (HSS)). The router ID is then used to obtain an encryption key from the key server.

At block 304, the firmware server 130 encrypts the firmware to be dispatched to the Wi-Fi router 102. Such encryption prevents the content of the firmware to be intercepted by a malicious (e.g., unauthorized) user. If the encryption key is a symmetric key, the key itself may be used to encrypt. If an asymmetric encryption scheme is used, the firmware server 130 can ask the key server to contact the router and then generate an encryption key.

At block 306, the firmware server 130 creates a provisioning digital message. The provisioning digital message includes the encrypted firmware and a digital certificate. In various embodiments, the decryption key may be sent as part of the provisioning digital message (i.e., with the encrypted firmware code and the digital certificate) or separately (e.g., either before or after the provisioning digital message).

At block 308, the Wi-Fi router 102 receives the provisioning digital message from the firmware server 130.

At block 310, the Wi-Fi router 102 decrypts the digital message using the decryption key, thereby extracting the router firmware from the provisioning digital message.

At block 312, the Wi-Fi router 102 installs the firmware 224 in its memory 202. Accordingly, the Wi-Fi router 102 now has security protection that is superior to that of known routers. That is because, the firmware 224 that has been provided by the firmware server 130 and installed in the router, prevents unauthorized backdoor inquiry and/or modification of the firmware 224.

FIG. 3B illustrates a high level example call flow for a firmware maintenance stage that may occur after the provisioning stage. The firmware maintenance flow 300B may be performed when there is a request to read, alter, or replace (e.g., flash) the firmware 224 of the Wi-Fi router 102. For example, such firmware 224 update may be performed at predetermined intervals, or when appropriate (e.g., when a firmware update is available), by an authorized firmware provider, such as firmware server 130. Such firmware inquiries may also be attempted by an unauthorized user, which are ignored/discarded by the Wi-Fi router 102, as described below. Accordingly, flow 300B allows authorized access to the firmware for reading, modification, and replacement, but blocks unauthorized access.

At block 320, a digital message is received by the Wi-Fi router 102. This digital message may originate from various sources, such as the UE of FIG. 1 or a remote computing device, such as firmware server 130. The digital message may be received via a Wi-Fi network 112, a wired network 114, or from a remote server computing device via a cable broadband connection 106. In one embodiment, the digital message may be received via a cellular network 104 via a licensed communication network 126.

At block 322, the integrity of the received digital message is determined. For example, a determination is made whether the digital message is in the format of a firmware update. If the integrity of the digital message cannot be confirmed (i.e., "NO" at block 322), the process goes to block 326, where the digital message is ignored/discarded, thereby preventing unauthorized access to the existing firmware of the router 102. In various embodiments, a CRC (cyclic redundancy check) and a message digest check can be performed to determine the integrity. In both of these techniques, a number is generated by scanning the message where each character contributes a value to a formula. The result is a number called a message digest. The receiver receives the message and runs the same formula. If a different number is generated, then it can be determined that the message was corrupted or compromised. If the same number as the message digest is generated, then one can be reasonably confident that the message was not compromised.

However, if the Wi-Fi router 102 confirms the integrity of the digital message (i.e., "YES" at decision block 322), the process continues with block 324, where the digital signature is verified. In this regard, the digital signature of the digital message is compared to a previously stored digital signature. If the digital signature cannot be verified (i.e., "NO" at decision block 324), the received digital message is ignored/discarded in block 326, thereby preventing unauthorized access to the existing firmware of the router 102.

However, if the digital signature can be verified, (i.e., "YES" at decision block 324), the process continues with block 330.

In one embodiment, the security functions of confirming the integrity of the digital message (i.e., block 322) and/or verifying the digital signature of the digital message (i.e., block 324) are performed by a remote authentication server. In this regard, the received digital message is sent to the remote authentication server for processing. If a confirmation is not received from the remote authentication server confirming the integrity and/or verifying the digital signature of the received digital message, the digital message is ignored/discarded 326. Otherwise, the method continues with block 330.

At block 330, the Wi-Fi router 102 decrypts the digital message using the decryption key, thereby extracting the router firmware from the digital message. As discussed above, the decryption key may be provided during the provisioning stage of 300A.

At block 332, the Wi-Fi router 102 installs the new firmware in its memory 202. Put differently, the existing firmware 224 is flashed with the new firmware provided by the authorized provider. In one embodiment, the Wi-Fi router 102 sends a confirmation to the originator of the digital message to confirm that the request/update was completed.

Example Computer Platform

Figure 4:
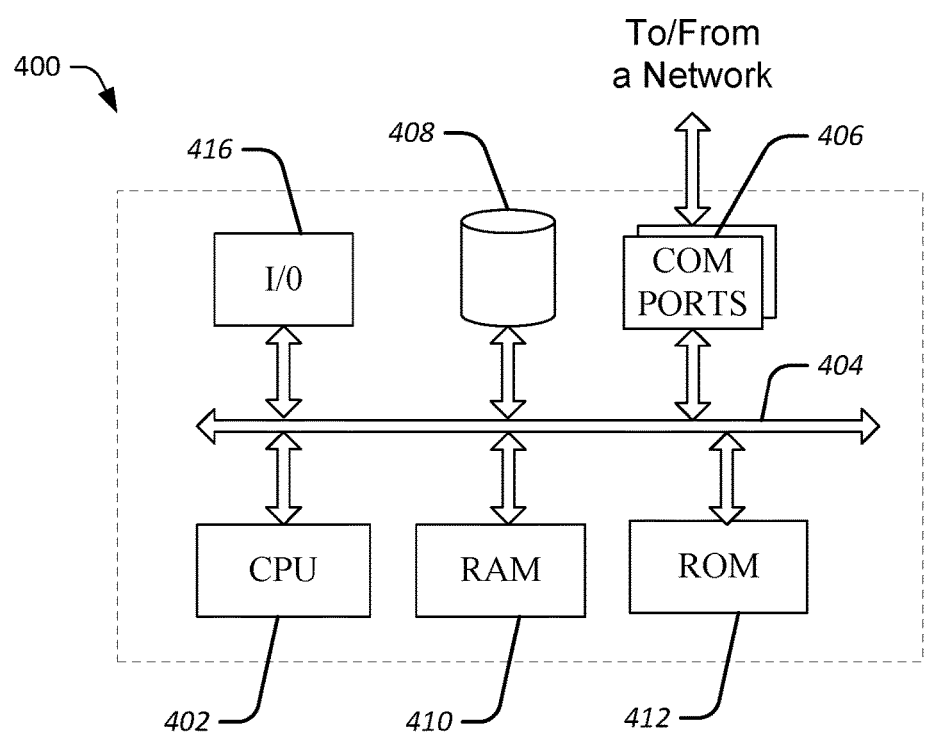
FIG. 4 provides a functional block diagram illustration of a computer hardware platform that is used to implement the security hardening system.

As discussed above, functions relating to security hardening of a Wi-Fi router can be performed on one or more computing devices connected for data communication via wireless or wired communication, as shown in FIG. 1 and in accordance with the processes of FIGS. 3A and 3B. An exemplary computing device in the form of a Wi-Fi router 102 has been discussed above with respect to FIG. 2. FIG. 4 provides a functional block diagram illustration of a general purpose computer hardware platform. In particular, FIG. 4 illustrates a network or host computer platform 400, as may typically be used to implement a server, such as the firmware server 130, authentication server, or a computing device, such as UE 116, 118, 120, and 122 of FIG. 1. It is believed that the general structure and general operation of such equipment as shown in FIG. 4 should be self-explanatory from the high-level illustration.

A general purpose computer configured as a server, for example, includes a data communication interface 406 for packet data communication. The server computer may include an I/O interface 416 that may include a display, a touch screen, a keyboard, a pointing device, a microphone, a loudspeaker, and/or any other type of user interface device. The server computer also includes a central processing unit (CPU) 402, in the form of one or more processors, for executing program instructions. The server platform typically includes an internal communication bus 404, program storage 408, and data storage for various data files to be processed and/or communicated by the server, although the server often receives programming and data via network communications. Data can be stored in various forms of computer-readable media, including (but not limited to) hard disk 408, random access memory (RAM) 410, read only memory (ROM) 412, and the like.

The hardware elements, operating systems and programming languages of such servers are conventional in nature. Of course, the server functions may be implemented in a distributed fashion on a number of similar platforms, to distribute the processing load. In one embodiment, the functionality of the firmware server 130 and the authentication server may be combined in one or more server platforms. For example, the functions of the authentication server and the firmware server 130 may be performed on the same server (e.g., firmware server 130).

The software functionalities discussed herein involve programming, including executable code as well as associated stored data, e.g., files used for applications on the firmware and/or authentication server, or Wi-Fi router 102 to facilitate the creation of firmware, encryption of firmware, creation of a digital message, description of a digital message, confirmation of the integrity and digital signature of the digital message, and flashing of the router firmware, as discussed herein.

The software code is executable by the corresponding computing device. In operation, the code is stored within the computing device. At other times, however, the software may be stored at other locations and/or transported for loading into the appropriate computing device system. Execution of such code by a processor of the computing device enables the computing device to perform the router security functions described herein. Hence, aspects of the methods of security hardening a Wi-Fi router 102 as outlined above may be embodied in programming. Program aspects of the technology may be thought of as "products" or "articles of manufacture" typically in the form of executable code and/or associated data that is carried on or embodied in a type of non-transitory machine readable medium.

CONCLUSION

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

It is understood that the receipt of the firmware from the firmware server 130 is performed upon subscriber approval. It is understood that any specific order or hierarchy of steps in the processes disclosed in FIGS. 3A and 3B are illustrations of exemplary approaches. Based upon design preferences, it is understood that the specific order or hierarchy of steps in the processes may be rearranged, expanded, and some steps omitted. Some of the blocks may be performed simultaneously. For example, the action of verifying the digital signature of the digital message can be performed before, at the same time, or after the confirmation of the integrity of the received digital message.

Unless otherwise stated, any measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A router comprising:
   a processor;
   at least one network interface coupled to the processor configured to enable communications via one or more communication networks;
   a memory for content and programming;
   a program stored in the memory, wherein execution of the program by the processor configures the router to perform acts comprising, during a provisioning stage:
      receiving a provisioning digital message from a firmware server, the provisioning digital message comprising a digital certificate and an initial encrypted firmware that, when unencrypted and installed on the router, prevents unauthorized access to an existing firmware of the router;
   the program being further executed by the processor to configure the router to perform acts comprising, during a maintenance stage:
      receiving a digital message;
      determining whether the digital message has integrity;
      determining whether a digital signature of the digital message is correct;
      upon determining that at least one of: (i) the digital message does not have integrity, or (ii) the digital signature of the digital message is not correct, ignoring or discarding the digital message; and
      upon determining that (i) the digital message does have integrity, and (ii) the digital signature of the digital message is correct:
         decrypting the digital message;
         extracting a new firmware from the digital message; and flashing the existing firmware of the router in the memory with the new firmware.

2. The router of claim 1, wherein only firmware that prevents access via at least one of Telnet and SSH is used to flash the existing firmware in the memory with the new firmware.

3. The router of claim 1, wherein the initial encrypted firmware has a symmetric key encryption.

4. The router of claim 1, wherein execution of the program further configures the router to perform acts comprising, during a provisioning stage: receiving a decryption key operative to decrypt the provisioning digital message received from the firmware server.

5. The router of claim 4, wherein upon determining that (i) the digital message does have integrity, and (ii) the digital signature of the digital message is correct, the decryption key is used to decrypt the digital message.

6. The router of claim 1, wherein a new digital message is received by the router from the firmware server at predetermined intervals.

7. The router of claim 1, further comprising a cellular broadband driver, and wherein a new digital message is received by the router from the firmware server via a cellular network.

8. The router of claim 1, further comprising a security application stored in the memory, wherein the security application performs an act of at least one of (i) determining that the digital message has integrity, or (ii) determining that the digital signature of the digital message is correct.

9. The router of claim 1, wherein execution of the program further configures the router to perform acts comprising:
determining that the digital message is in a format of a firmware update, and
wherein determining that the digital message has integrity, is based on the digital message being in the format of the firmware update.

10. The router of claim 1, wherein determining whether the digital message has integrity comprises performing at least one of: (i) a cyclic redundancy check (CRC) or (ii) a message digest check.

11. The router of claim 1, further comprising:
sending the digital message to a remote authentication server; and
receiving a confirmation from the remote authentication server that at least one of (i) the digital message does have integrity, or (ii) that the digital signature of the digital message is correct,
wherein, determining that at least one of (i) the digital message does have integrity, or (ii) that the digital signature of the digital message is correct, is based at least in part on receipt of the confirmation.

12. A non-transitory computer-readable medium having stored thereon a plurality of sequences of instructions which, when executed by one or more processors, cause the one or more processors to perform a method of securing a firmware of a router, the method comprising:
receiving a digital message;
sending the digital message to a remote authentication server;
in response to receiving, from the remote authentication server, a first confirmation that at least one of: (i) the digital message does not have integrity, or (ii) a digital signature of the digital message is not correct, ignoring or discarding the digital message;
in response to receiving, from the remote authentication server, a second confirmation that (i) the digital message does have integrity, and (ii) the digital signature of the digital message is correct:
decrypting the digital message;
extracting a new firmware from the digital message; and
flashing an existing firmware with the new firmware.

13. The method of claim 12, further comprising:
receiving a provisioning digital message from a firmware server, the provisioning digital message including a digital certificate and an initial encrypted firmware that, when unencrypted and installed on the router, is operative to prevent unauthorized access to the firmware of the router.

14. The method of claim 13, further comprising, in a provisioning stage receiving a decryption key operative to decrypt the provisioning digital message received from the firmware server.

15. The method of claim 14, wherein upon receiving, from the remote authentication server, the second confirmation that (i) the digital message does have integrity, and (ii) the digital signature of the digital message is correct, decrypting the digital message with the decryption key.

16. The method of claim 13, wherein a new digital message is received by the router from the firmware server via a cellular network.

17. The method of claim 12, wherein, receiving the second confirmation that the digital message does have integrity, is based at least in part on the digital message being in a format of a firmware update.

18. The method of claim 12, wherein, receiving the second confirmation that the digital message does have integrity is based at least in part on one of a (i) a cyclic redundancy check or a message digest check.

19. The method of claim 12, wherein only firmware that prevents access via at least one of Telnet and SSH is used to flash the existing firmware with the new firmware.

20. The method of claim 13, wherein the initial encrypted firmware has a symmetric key encryption.

* * * * *